US012803997B2

(12) United States Patent
Edwards et al.

(10) Patent No.: US 12,803,997 B2
(45) Date of Patent: Nov. 17, 2026

(54) SYSTEMS AND METHODS FOR DETECTING UNAUTHORIZED ACCESS

(71) Applicant: Capital One Services, LLC, McLean, VA (US)

(72) Inventors: Joshua Edwards, Philadelphia, PA (US); Purva Shanker, Arlington, VA (US); Nathan Wolfe, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 594 days.

(21) Appl. No.: 18/366,645

(22) Filed: Aug. 7, 2023

(65) Prior Publication Data

US 2025/0055865 A1 Feb. 13, 2025

(51) Int. Cl.
*H04L 9/40* (2022.01)
*G06N 7/01* (2023.01)

(52) U.S. Cl.
CPC ........... *H04L 63/1425* (2013.01); *G06N 7/01* (2023.01)

(58) Field of Classification Search
CPC ... H04L 63/1425; H04L 63/1416; G06N 7/01; G06N 20/00
See application file for complete search history.

(56) References Cited

U.S. PATENT DOCUMENTS

2016/0330217 A1* 11/2016 Gates .................. H04L 63/1441
2019/0098036 A1* 3/2019 Kyle ................... H04L 63/0227
2020/0329062 A1* 10/2020 Beauchesne .......... H04L 63/105
2022/0131878 A1* 4/2022 Tokosch ................ G06F 21/604
2023/0370476 A1* 11/2023 Bakshi ................ H04L 63/1433
2024/0403420 A1* 12/2024 Lal ......................... G06F 21/566
2025/0045437 A1* 2/2025 Koshti .............. G06F 16/24578

OTHER PUBLICATIONS

R. Vinayakumar, M. Alazab, K. P. Soman, P. Poornachandran, A. Al-Nemrat and S. Venkatraman, "Deep Learning Approach for Intelligent Intrusion Detection System," in IEEE Access, vol. 7, pp. 41525-41550 (Year: 2019).*

* cited by examiner

*Primary Examiner* — Amir Mehrmanesh
*Assistant Examiner* — Thomas A Gyorfi
(74) *Attorney, Agent, or Firm* — Foley & Lardner LLP

(57) ABSTRACT

Systems and methods for detecting unauthorized access are disclosed herein. In some aspects, the system receives a combined activity dataset. The system updates a base breach detection model based on the combined activity dataset to generate a combined breach detection model. The system duplicates the combined breach detection model to generate a first breach detection model for a first user. The system receives a first activity dataset for the first user and trains a labeling model to associate activities from the first activity dataset with the first user. The system processes the combined activity dataset using the labeling model to associate activities from a portion of the combined activity dataset with the first user. The system updates the base breach detection model based on activities from the first activity dataset and the portion of the combined activity dataset to generate a second breach detection model to detect breach activity.

20 Claims, 6 Drawing Sheets

100

| User Account Database 102 | |
|---|---|
| User Account Identifier 104 | Associated Users 106 |
| 38923943 (Account 120A) | J. Maran |
| | B. Abilashan |
| | C. Darsha |
| | G. Sanjeet |
| 57839201 | R. Shere |
| | P. Dyal |
| | M. Kannan |
| 09920491 | S. Subbu |

| User Account Database 108 | |
|---|---|
| User Account Identifier 110 | Associated Users 112 |
| 38923943 (Account 120A) | J. Maran |
| | B. Abilashan |
| | C. Darsha |
| 57839201 | R. Shere |
| | P. Dyal |
| | M. Kannan |
| 09920491 | S. Subbu |
| 99520398 (Account 120B) | G. Sanjeet |

FIG. 1A

| User Activity Log **120** | | | | | |
|---|---|---|---|---|---|
| User Account Identifier **122** | Activity Timestamp **124** | Activity Type **126** | Activity Value **128** | Breach Probability **130** | |
| 38923943 | 2023-01-04T18:39-05:00 | Download | 85 MB | 10.5% | 132a |
| | 2023-01-05T08:21-05:00 | Upload | 20 MB | 1.3% | 132b |
| | 2023-01-05T12:23-05:00 | Upload | 3 MB | 0.5% | 132c |
| | 2023-01-06T13:32-05:00 | Download | 503 MB | 17.8% | 132d |
| 99520398 | 2023-01-04T13:39-05:00 | Download | 156 MB | 5.2% | 132e |
| | 2023-01-05T19:01-05:00 | Upload | 3 MB | 0.5% | 132f |
| | 2023-01-06T02:47-05:00 | Download | 50.3 GB | 70.2% | 132g |
| | 2023-01-06T02:51-05:00 | Upload | 302.23 GB | 93.5% | 132h |

FIG. 1B

140

| Activity Training Data 142 | | | | |
|---|---|---|---|---|
| User Account Identifier 144 | Activity Timestamp 146 | Activity Type 148 | Activity Value 150 | Breach Indicator 152 |
| 38923943 | 2022-12-25T21:37-05:00 | Download | 380 MB | Valid |
| | 2022-12-26T22:38-05:00 | Upload | 15 MB | Valid |
| | 2022-12-26T03:32-05:00 | Upload | 99 MB | Valid |
| | 2022-12-28T07:56-05:00 | Download | 199 GB | Breach |
| 99520398 | 2022-12-27T23:39-05:00 | Download | 14 MB | Valid |
| | 2022-12-28T03:01-05:00 | Upload | 52 MB | Valid |
| 57839201 | 2022-12-20T08:56-08:00 | Download | 756 MB | Valid |
| | 2022-12-21T20:01-08:00 | Upload | 0.01 MB | Breach |
| 09920491 | 2022-12-23T06:39+05:30 | Download | 23 MB | Valid |
| | 2022-12-24T07:01+05:30 | Download | 66 MB | Valid |
| | 2022-12-25T07:02+05:30 | Download | 76 MB | Valid |

FIG. 1C

SYSTEMS AND METHODS FOR DETECTING UNAUTHORIZED ACCESS

SUMMARY

The security of systems, such as computer networks, greatly benefits from mitigation against security risks or data breaches. A computer system, such as a system capable of accessing data servers, network services, or other network-based applications, may exclude malicious entities from unauthorized access to system resources. By doing so, a system may protect itself from abuse of resources or other security breaches, such as user credential theft or Trojan horse-type vulnerabilities. Particularly sensitive system resources, such as system administrator information, directories, computer processor allotments, or data, may be especially vulnerable to unauthorized access by malicious actors, such as for credential theft or malicious monitoring of user activity.

Methods and systems are described herein for novel uses and/or improvements to security breach detection for user accounts within vulnerable systems, such as network access services. As one example, methods and systems are described herein for improving detection of security breaches within user accounts where a user that is initially associated with a combined account with other users creates an independent account. To illustrate, multiple users may have access to a web browser under a single, combined account. Subsequently, one of these users may create an additional account for his/her/their own individual use of the web browser. Based on user activity corresponding to both the combined account and the individual account, the system enables fine-tuning of security breach detection and mitigation.

Existing systems often rely on generic detection algorithms or models to detect security breaches. For example, conventional systems may determine that a security breach is likely to occur by evaluating user account history for criteria or rules. For example, a conventional system detects an IP address or location associated with user activity, such as data downloads or uploads. Based on a change in IP address or location, the system can flag this behavior as unexpected and, as such, a potential security breach. However, such conventional systems may fail to account for user-specific behavior, such as a user who frequently works in multiple locations. For example, a security breach involved with IP address or location masking may trick such conventional systems into believing that breach activity is incorrectly associated with the authorized user. Furthermore, rule- or criteria-based conventional systems can fail to account for more complex user activity patterns indicative of a security breach, such as where malicious actors artificially mimic normal user activity prior to executing a security breach-related activity to trick the system.

Conventional systems benefit from use of artificial intelligence systems for improvements in detection. For example, artificial intelligence models can be trained based on user activity data corresponding to multiple users, along with information about which user activities were associated with security breaches. Thus, conventional systems may make predictions based on large-scale patterns in user activity. For example, conventional systems that leverage machine learning can exhibit improved breach detection in comparison to rule-based systems. However, such conventional systems may struggle to accurately predict security breaches that are account-dependent, particularly in situations where multiple users utilize the same account. For example, in situations where multiple users use the same account (e.g., children use a parent's web browser account on a laptop at school, rather than at a parent's office), the system may flag such behavior as a breach due to the change in location or use of the browser at unexpected times. Furthermore, even conventional systems that are trained to learn from the behavior of multiple users for a single user account may not provide accurate results if or when an existing user creates an independent account. For example, a conventional system may have to generate or train a new model from scratch to learn the particular user activity behavior of the independent account user. Thus, adapting artificial intelligence models to accurately determine the likelihood of user activity corresponding to security breaches requires a personalized and flexible approach to generating and applying training data.

To overcome these technical deficiencies in adapting artificial intelligence models for this practical benefit, methods and systems disclosed herein generate a user-specific breach detection model by updating a base breach detection model based on activities associated with a first user, such that the model may better capture the first user's habits. Furthermore, the system may use the first user's activity to label prior activities in the combined account that are likely associated with the first user. The system may use these labels to further improve the accuracy of the first user's breach detection model by generating more training data pertaining to the first user and further training the user-specific model. By doing so, the system improves security breach detection in situations where a user associated with a combined account starts a new, individual account. Accordingly, the system may provide per-user evaluations of whether user activity is genuine or unauthorized, thereby improving accuracy and system-wide security due to unauthorized activity. In some aspects, the system can receive a combined activity dataset associated with multiple users of a user account. For example, the system can receive a combined activity dataset, wherein the combined activity dataset comprises a plurality of activities corresponding to a combined account, and wherein the combined account is associated with a plurality of users. As an illustrative example, the system can receive information relating to activity associated with all active users of the user account, such as uploads or downloads, files or websites visited, and corresponding timestamps. By doing so, the system may receive enough information to train a model to identify common patterns associated with the users of the account, thereby tuning the model to have improved accuracy with respect to the combined account.

In some aspects, the system can update a base breach detection model to generate a combined breach detection model, based on information within the combined activity dataset. For example, the system may update a base breach detection model based on the combined activity dataset to generate a combined breach detection model, wherein the combined breach detection model is trained to detect breach activity for the plurality of users. In some implementations, the system may receive parameters or information associated with a base breach detection model, which may be trained to detect security breaches for a generalized user account. The system may fine-tune this model based on user activity associated with the combined account. By doing so, the system learns about the habits and behaviors of users of the combined account, thereby improving the quality of the breach detection model as applied to the combined account.

In some aspects, in response to detecting the creation of a new account by a user of the combined account, the system may duplicate the model to generate a new model for the newly created account. For example, in response to receiving an indication of a first user account created for a first user of the plurality of users, the system may duplicate the combined breach detection model to generate a first breach detection model that is linked to the first user. In some embodiments, the system may receive notification that a user of the combined account has decided to create a new account for herself. In response to such a notification, the system may generate a breach detection model to be trained on activity within the new account to detect security breaches. Thus, the system may improve breach detection by enabling personalization of the breach detection model utilized with the user creating a new account, improving accuracy of breach detection and mitigating credential theft.

In some aspects, the system may receive user activity pertaining to the user who opened the account. For example, subsequent to generating the first breach detection model, the system can receive a first activity dataset for the first user. In some embodiments, the system may, for example, receive a list of activities performed by the user, such as a list of downloads or uploads. The list of activities may be accompanied by timestamps and any other information that may be pertinent to security breach detection, such as download or upload file sizes. By receiving such information, the system can learn about the user's behavior, such as when certain activities, such as downloads, are more likely to be executed and what sort of files are likely to be transferred. By doing so, the system receives contextual information to aid in training breach detection models to detect unexpected behavior.

In some aspects, the system may train a labeling model based on the activity dataset corresponding to the first user. For example, the system may train a labeling model to associate activities from the first activity dataset with the first user. In some embodiments, the system may, for example, utilize the list of activities performed by the user to determine activities and/or activity patterns characteristic of the first user based on information within the user activity dataset. For example, the user may be associated with downloading files with sizes over 100 megabytes after 11:00 p.m. at night, but not at other times. By labeling the model, the system can determine whether, for instance, a download of 200 megabytes at 11:45 p.m. likely corresponds to the user or, instead, to behavior corresponding to the combined account (e.g., other users of the combined account). Doing so enables the system to identify activities that are likely associated with the user of the new account, thereby improving information available to the system for further training of security breach detection models.

In some aspects, the system may determine activities within the combined activity dataset that are associated with the user of the created account. For example, the system may process the combined activity dataset using the labeling model to associate activities from a first portion of the combined activity dataset with the first user. In some embodiments, the system can use the labeling model to identify activities of the combined dataset that are likely associated with the first user, rather than the other users of the combined account. For example, the system can determine that downloads after 11:00 p.m. are likely associated with the first user, while other downloads at other times are likely executed by other entities associated with the combined account. By doing so, the system generates additional training data related to the first user to improve and personalize the first user's breach detection model.

In some embodiments, the system may update the breach detection model to incorporate information relating to the first user based on the labeling model. For example, the system may update the base breach detection model based on the activities from the first activity dataset and the activities from the first portion of the combined activity dataset to generate a second breach detection model, where the second breach detection model is trained to detect breach activity for the first user. For example, the system may utilize activities from the combined dataset that are likely associated with the first user. The system can provide these activities to the base breach detection model to train a personalized version of the model to detect breaches associated with the first user's account. For example, the system can include an indicator of whether activities in the combined activity dataset that are associated with the first user are linked to security breaches, as well as the corresponding activities, and provide this information to the base breach detection model for training and personalization of breach detection. By doing so, the system improves the accuracy of the breach detection model as applied to the first user, by training breach detection models based on information pertaining to the first user's habitual activities associated with both the combined account and the corresponding created account.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows illustrative data structures for user account databases and corresponding users, in accordance with one or more embodiments.

FIG. 1B shows an illustrative data structure for user activity logs associated with user accounts, in accordance with one or more embodiments.

FIG. 1C shows an illustrative data structure for user activity training data associated with user accounts for training breach detection models, in accordance with one or more embodiments.

DETAILED DESCRIPTION

Figure 2:
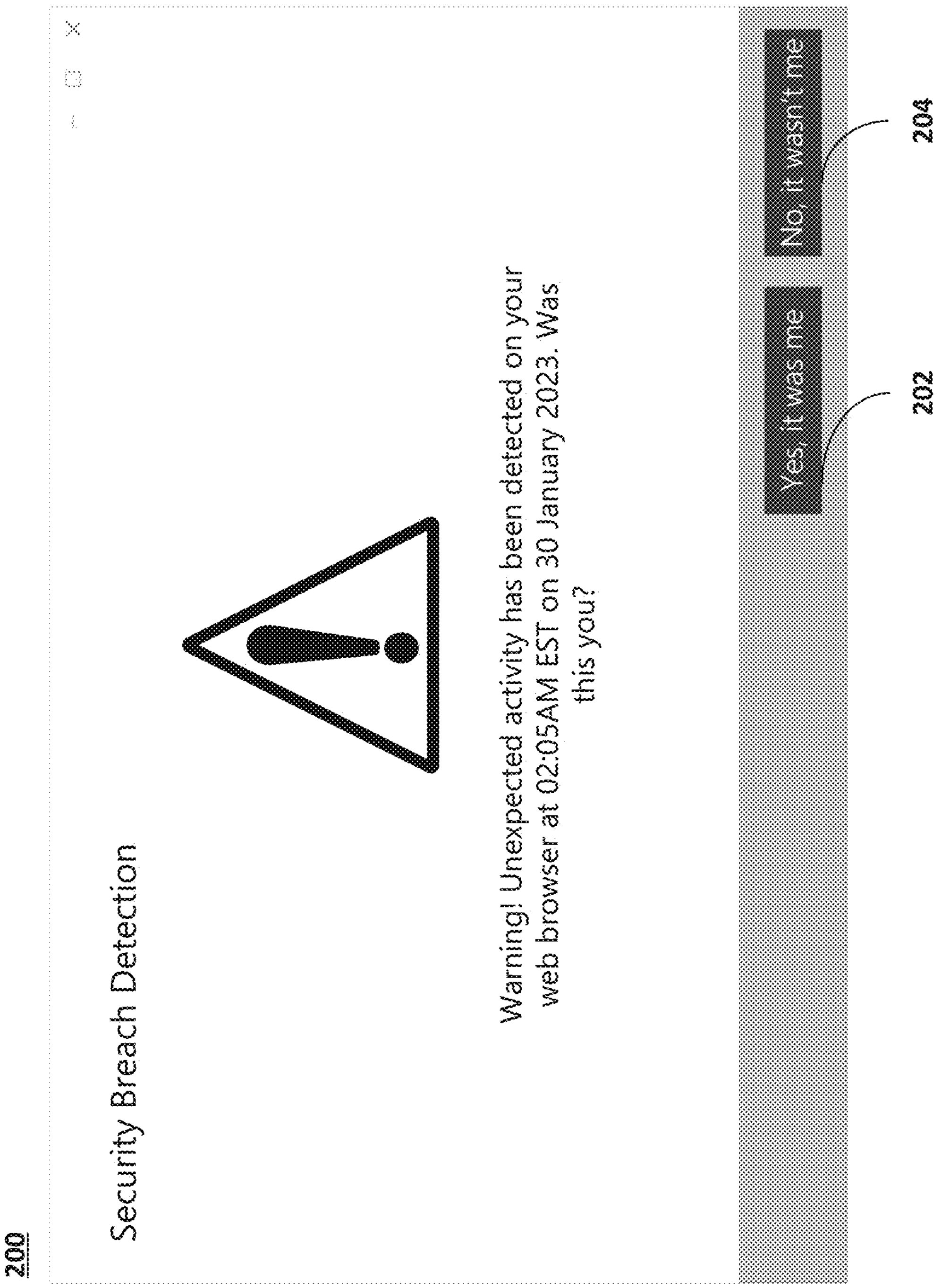
FIG. 2 shows an illustrative diagram for a breach detection notification or message associated with a user account, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows illustrative data structures for user account databases and corresponding users, in accordance with one or more embodiments. For example, user account database 102 depicts user accounts, as well as associated user account identifiers 104, where each user account may be associated with one or more associated users 106. For example, user accounts depicted could include accounts for access to resources, such as accounts that enable access to cloud services, web services (e.g., accounts for web browsers). In some cases, a single user account may be utilized by one or more associated users 106, as depicted in FIG. 1A for the account associated with account identifier (e.g., account 120A). For example, multiple users may have access to the same device or token that enables access to the corresponding resources and, as such, multiple users may be associated with the same account identifier.

In some cases, one or more users may become unaffiliated with an original account and/or affiliated with another user account instead. For illustrative purposes, user account database 108 depicts the state of user accounts within a network access system after a certain elapsed time from user account database 102. For example, as shown in FIG. 1A, user "G. Sanjeet" of account 120A shown in user account database 102 is, after the elapsed time, associated with user account 120B in user account database 108 instead. User account database 108 may store updated user account identifiers 110 and updated associated users 112. For example, the user in question may have configured a new device with a new account for independent access to resources. As such, any models for detecting security breaches that have been personalized or configured specifically for associated users of the original account can benefit from information regarding activity from the given user. For example, an original breach detection model configured to detect security breaches for all users associated with account 120A may not capture account behavior associated with account 120B, as the users of the account have changed. Similarly, account 120A may exhibit different user behavior following the change in associated users. To improve the detection of security breaches in situations such as these, the systems and methods disclosed herein enable improvements to efficiency and accuracy in breach detection models associated with user accounts where users associated with the account have changed (e.g., in situations where an account has been added for an existing user of another combined account).

In some embodiments, an account (e.g., a user account) may include a collection of information that includes one or more users' identities and privileges for resource access and facilitates access of such resources for the user. For example, an account can include a unique identifier (e.g., user account identifiers 104 or updated user account identifiers 110), as well as identifiers of users associated with the account (e.g., associated users 106 or 112). User accounts may require authentication credentials for access to resources or may be configured as linked to a device or token. For example, a user account can include an interface or an account that enables access to a network, including cloud storage or the internet. In some implementations a user account may include an account that enables access to resources, such as a credit line (e.g., a credit card account) or currency (e.g., a checking or a savings account). Such a user account may be associated with one user. Additionally or alternatively, a user account may include an account used by more than one user (e.g., a combined account), such as in the case of a joint credit card account associated with two or more users. Information regarding user accounts (e.g., user account identifiers or users associated with accounts) may be stored within a user account database, such as database 102 or 108.

In some embodiments, a user account may include an identifier, such as user account identifiers 104 or 110. For example, an identifier may include any token, alphanumeric string, or symbol identifying a user account. In some embodiments, an account identifier may include a username, an account name, or an alphanumeric token uniquely identifying a given account. Alternatively or additionally, an account identifier may include a credit card account number, such as a 16-digit number associated with a given account. By utilizing account identifiers, the system may manage and track opened or closed accounts, as well as associated users, thereby enabling personalization of breach detection.

One or more users may be associated with an account. As referred to herein, a user may include any user of an account. For example, a user may include an entity associated with the account, such as an account holder of a network access account, such as an account for a web browser. A user may include an account holder for a credit card account or a bank account (e.g., a primary account holder for a credit card account). Additionally or alternatively, a user may include one or more authorized users, such as a secondary account holder. In some embodiments, a user may include an unauthorized user of an account, such as an entity utilizing the account with or without permission from the account holder. For example, a user may include a family member of an account holder for a web browser with access to the account holder's computer, such as a child or another dependent. In some cases, a user may include another user of a credit card or credit card account. Because accounts may exhibit variations in users associated with them over time, and because account-related behavior, such as account activity (e.g., transactions on a credit card account) may depend on the users associated with the account, security breach detection based on account activity may be highly user-dependent. For example, a first authorized user of an account may make online purchases late at night, while a plurality of other authorized users may usually only make purchases during business hours. Thus, if the first authorized user forms a new account, behavior that may be indicative of a security breach may differ from the original combined account, as the original combined account is associated with the remaining users. As such, systems disclosed herein enable improvements to breach detection systems based on user-level account-related activity data.

FIG. 1B shows an illustrative data structure for user activity logs associated with user accounts, in accordance with one or more embodiments. For example, FIG. 1B depicts user activity log 120 detailing information relating to user activities associated user accounts. For example, user activity log 120 may include indications of times corresponding to activities (e.g., activity timestamps 124), a characterization or classification of the activity (e.g., activity type 126), a value associated with the activity (e.g., activity value 128), and an identifier of an account associated with the given activity (e.g., user account identifier 122). Additionally or alternatively, the system may generate an indication of a likelihood that an activity is associated with a security breach (e.g., breach probability 130). By tracking user activities associated with accounts, the system may better track or detect security breach events by determining whether an event is likely associated with an account holder or another user of the account.

For example, an activity dataset may include an activity log or any data providing information regarding activities. In some embodiments, an activity may include any process, task, transaction, communication, or action performed by entities. For example, as shown in FIG. 1B, any of activities 132*a-h* may include data center-related account tasks or processes, such as downloads, uploads, or file transfers. Alternatively or additionally, activities may include transactions or events related to a user account (e.g., account-related events), such as credit card accounts or debit card accounts. For example, an activity may include a credit card transaction at a merchant, where the transaction may be associated with a given credit card account. For example, such transactions may include online transactions or transactions at points-of-sale. In some embodiments, user activities may be associated with one or more activity timestamps (e.g., activity timestamps 124), which may indicate a time (e.g., month, date, year, and/or time of day) associated with an activity. In some embodiments, an activity timestamp may correspond to a time at which an activity was initiated; alternatively or additionally, an activity timestamp may correspond to a time at which an activity was actually performed or completed. Activity timestamps may provide context for an activity-some activities may be likely to be associated with an authorized user of an account during certain times of the day but may be unlikely to correspond to such an authorized user if executed at a different time of day. Because some activities are likely to be associated with a given user account, any unauthorized or fraudulent activity relating to an account may be determined based on whether the given activity is likely to be associated with the account. For example, the system may leverage supervised and/or unsupervised learning, including breach detection models, to analyze account-related events and/or activities for whether a security breach may have occurred, thereby personalizing and improving security breach detection.

In some embodiments, a combined activity dataset may include activity data corresponding to a combined user account. For example, a combined activity dataset may include information relating to activities performed by any users of a given account, which may include authorized users (e.g., primary and/or secondary users) and/or users with permission from authorized users. For example, a combined activity dataset may include activities relating to a family member (e.g., a teenager) using a relative's account (e.g., a parent's credit card account) to complete a personal transaction (e.g., to buy a new video game). Alternatively or additionally, a combined activity dataset may include browsing activities relating to another user of a web browser account with access to a primary user's computer. As such, activities within a combined activity dataset may not necessarily correspond to security breaches, even if they are performed by more than one user associated with the account. However, in some embodiments, the system may generate or provision a breach detection model for the combined activity dataset to detect security breaches corresponding to malicious entities that are not formally or informally associated with the corresponding combined user account. Furthermore, users associated with the combined activity dataset may start corresponding accounts (e.g., when the teenager goes to university and starts a credit card account of his/her/their own). As such, the system enables the breach detection model to update based on changes in users of given accounts, such as changes discussed in FIG. 1A.

In some embodiments, user activities may be associated with breach probabilities, such as breach probabilities 130. In some embodiments, a breach probability may include an indication of a likelihood that an activity is not associated with a user. For example, a breach probability may include a percentage, fraction, or value of probability indicating a probability that a given activity is indicative of a security breach. As discussed in relation to FIG. 1C, a breach detection model may generate breach probabilities corresponding to activities or user accounts. In some embodiments, a breach probability may be associated with a plurality of activities, such as in the case where a pattern of activities may be indicative of a security breach. Additionally or alternatively, a breach probability may be associated with a user account as a whole based on all activity associated with the account. As shown in FIG. 1B, activity 132*f* may be unlikely to be associated with a security breach (e.g., with a breach probability of 0.5%), as it is associated with an upload of 3 megabytes (e.g., an insignificant activity) during the evening. In contrast, the system may determine activity 132*h* to be associated with a breach, as it comprises an upload of a significant amount of data several orders of magnitude above other habitual activity associated with the account. As such, the system may determine activity 132*h* to be more likely to be associated with a security breach (e.g., with a breach probability of 93.5%). As such, generating breach probabilities enables the system to detect and subsequently warn users of possible security breaches associated with their user accounts based on information relating to related activities.

In some embodiments, a breach probability may be compared with a threshold probability. For example, a threshold probability may include a probability value that likely indicates that a potential breach has occurred. In some embodiments, a threshold probability value may be set by default, or by a user or system administrator. Alternatively, the system may generate threshold probabilities based on metadata associated with user accounts. For example, a user account associated with low activity (and, therefore, where a breach detection model may not have sufficient data) may benefit from a lower threshold probability to capture security breaches where generated breach probabilities are lower than for more active accounts due to insufficient information. By comparing the breach probability corresponding to a given activity, user account, and/or set of activities with the threshold probability, the system may determine whether an account may exhibit a security risk. For example, the system may determine that an account is likely associated with fraudulent activities and, as such, an unauthorized, malicious entity may have access to the account.

In some embodiments, the system may utilize a labeling model. A labeling model may include a model that enables classification of data. For example, a labeling model may include a model that may label activities associated with a given user account with corresponding users. A labeling model may determine a user identifier associated with each activity 132*a-h* within user activity log 120. A labeling model may include supervised or unsupervised classification algorithms, such as any algorithm capable of determining whether data corresponds to one of the predetermined categories. Labeling models may include algorithms, such as logistic regression, the Naïve Bayes Algorithm, the K-Nearest Neighbor algorithm, the SVM (Support Vector Machine) algorithm, and/or the Decision Tree algorithm. In some embodiments, labeling models may utilize computer models, such as artificial neural networks (e.g., Multilayer Perceptron (MLP) algorithms or contrastive machine learning). The system may utilize a labeling model to label activities within a combined activity dataset, for example, based on likely users executing the transactions. For example, the labeling model may accept, for training, activities associated with user accounts for individual users. The labeling model may accept combined activity data associated with a combined account (e.g., associated with many of the individual users) as input, and output assignments of each activity with a likely actor. By doing so, the system may improve knowledge and personalization of activities performed by individuals associated with accounts, thereby enabling improvements to the accuracy and efficiency of breach detection models for accounts associated with the individual users.

The labeling model may be trained using training data. In some embodiments, training data for the labeling model may include any information or data that may enable categorization of activities or entities into labels. For example, training data may include an activity dataset that corresponds to particular accounts identified by a corresponding account identifier. By receiving multiple sets of activities corresponding to specified user accounts, the system enables training of a model to discern between activities performed by or associated with users of distinct accounts, thereby enabling labeling of subsequently received activities with a predicted associated user. By doing so, the system may categorize activities associated with the combined account into each of its associated users. Having determined which activities associated with the combined account are associated with corresponding users, the system may personalize and/or train breach detection models associated with any of these corresponding users to detect security breaches for these individual accounts, thereby improving the accuracy of security breach determination.

FIG. 1C shows illustrative data structure 140 for training data associated with user accounts for training breach detection models, in accordance with one or more embodiments. For example, FIG. 1C depicts activity training data 142, which includes activities with activity timestamps 146, activity types 148, activity values 150, and/or breach indicators 152. Furthermore, activities may be associated with corresponding user accounts using a user account identifier 144. For example, the system may train machine learning models to identify whether an activity or an account is associated with a security breach based on prior activity data, as well as in formation relating to whether particular activities are indicative of security breaches.

In some embodiments, the system may configure, receive, or update one or more breach detection models. A breach detection model may include a computer model, algorithm, or procedure for detecting potential security breaches. For example, a breach detection model may receive one or more activities, including activity types 126, values 128 associated with activities, and corresponding activity timestamps 124. The breach detection model may output corresponding breach probabilities 130 for the activities, as described previously. In some embodiments, the breach detection model may output other indications relating to the probability of breaches. For example, the breach detection model may output an indication of whether an account is likely subject to a security breach or not. Individual activities, such as a string of late-night, low-value transactions at a small merchant, that are input into the breach detection model may not exhibit high enough breach probabilities to warrant detection of a security breach. However, together, the group or pattern of activities may be indicative of a security breach; in the previous example, the late-night, low-value transactions may be indicative of a malicious entity attempting to test or defraud any breach detection systems. As such, a breach detection model may generate a prediction of security breaches related to user accounts based on associated activities, enabling the system to detect and warn users and system administrators prior to further breaches.

The system may personalize or modify breach detection models based on the nature of the corresponding user accounts. For example, the system may receive a base breach detection model, such as from a server or another device associated with the system. A base breach detection model may include a breach detection model provisioned to detect security breaches in user accounts associated with a generic user. For example, a base breach detection model may be trained based on activity training data 142 associated with multiple users (e.g., users that are system-wide), including breach indicators 152 indicating when an activity is associated with a security breach. In some embodiments, the system may receive model parameters (e.g., model weights for an artificial neural network) associated with the base breach detection model to enable generation of a personalized model based on the base breach detection model to be associated with a particular account. As such, a base breach detection model may generate accurate predictions of security breaches associated with accounts in an impersonalized, generic manner (e.g., for a generic user).

In some embodiments, the system may update the base breach detection model with information relating to one or more particular accounts. For example, the system may generate a combined breach detection model for detecting security breaches based on user activity for a combined account (e.g., a user account associated with one or more users). The combined breach detection model may include model parameters from a base breach detection model that have been updated (e.g., trained or tuned) according to habits (e.g., sets of activities) associated with a particular combined user account. In some embodiments, the system may similarly generate breach detection models for user accounts that are associated with individual users, such as by updating the base breach detection model according to activity by individual users acting within individual user accounts. By personalizing the base breach detection model, the system enables improvements in accuracy for detecting breaches, as users of different accounts may exhibit different habitual activity. For example, a combined account may be associated with a first user who habitually makes online purchases for video games in the early morning hours and a second user who habitually makes in-person purchases at points-of-sale during business hours. As such, activity associated with an early morning online purchase may not be indicative of a likely security breach for the combined account. In contrast, if the second user subsequently generates a corresponding new user account and splits off from the combined user account, an indication of a late-night online purchase may be indicative of a security breach, as the new user account is not associated with the first user. As such, the system disclosed herein enables leveraging information from both the combined user account as well as the independent user account, in order to improve security breach detection (e.g., fraudulent transaction detection) for both models.

Models disclosed herein may be trained using training data. For example, breach detection models may be trained using activity training data 142. In some embodiments, training data may include data that may train the labeling model and/or may train the breach detection model. As an illustrative example, FIG. 1C demonstrates activity training data, which may include previous activity data, as well as breach indicators 152. For example, breach indicators 152 may indicate whether activities within the training data are associated with security breaches or not. A breach indicator may include an indication of whether an activity was authorized or valid, or whether it was associated with a breach. By generating and/or retrieving activity training data, such as data within an activity dataset, along with corresponding breach indicators, the system may provide breach detection models with enough information to determine whether any subsequently received activities may be potentially associated with security breaches.

FIG. 2 shows an illustrative diagram for a breach detection notification or message associated with a user account, in accordance with one or more embodiments. For example, FIG. 2 depicts notification 200 for a detected security breach (e.g., for a web browser).

The system may generate a graphical user interface, as well as mechanisms (e.g., buttons or toggles), such as buttons 202 or 204. Notifications may include messages that indicate a potential breach. For example, a breach detection model may detect one or more activities that are likely related to security breaches. In response, the system may generate a message for display on a graphical user interface indicating the potential breach. In some embodiments, the message may include an indication of the potential breach, including information as to the activity, timestamp of the activity, activity type, and/or activity value. The system may receive a user response (e.g., through confirmation button 202 or rejection button 204) that may indicate whether the activity is associated with a user or was unauthorized. In some embodiments, a user response may include a verbal response, such as a text message or a voice message, confirming or denying the existence of a security breach. By enabling a user to provide feedback with respect to potential breaches, the system may determine whether or not to take evasive action (e.g., by deactivating the user account associated with the breach). Furthermore, the feedback may be used to generate breach indicators for further training data to train corresponding breach detection models.

Figure 3:
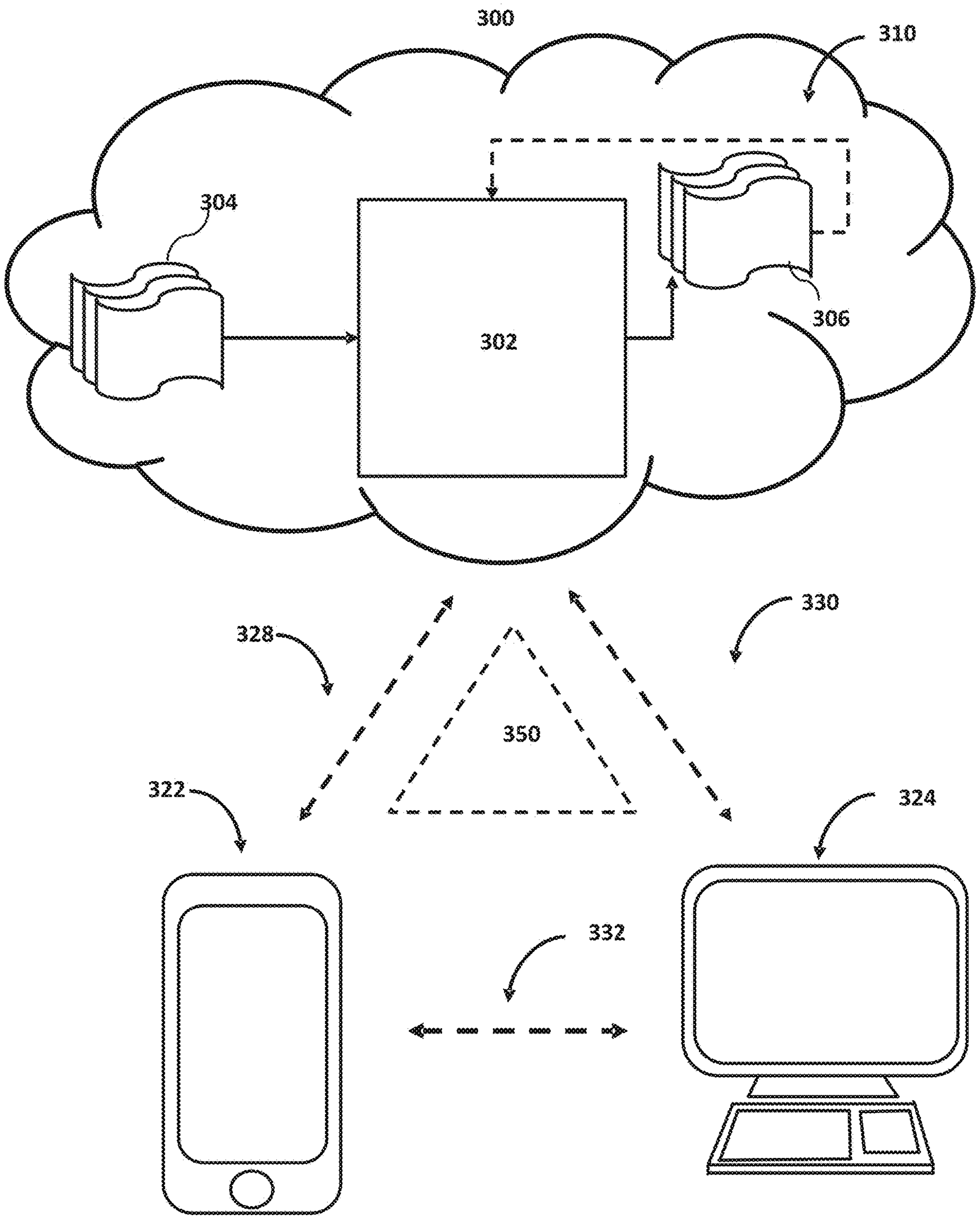
FIG. 3 shows illustrative components for a system used to improve breach detection for combined and/or independent accounts associated with different sets of users, in accordance with one or more embodiments.

FIG. 3 shows illustrative components for a system used to detect unauthorized access or security breaches associated with user accounts, in accordance with one or more embodiments. For example, FIG. 3 may show illustrative components for improving detection of fraudulent transactions associated with independent credit card accounts whose users were associated with combined accounts. As shown in FIG. 3, system 300 may include mobile device 322 and user terminal 324. While shown as a smartphone and personal computer, respectively, in FIG. 3 it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include user account servers, breach detection models, and may access information from user account databases, user activity databases, and/or training databases. For example, cloud components 310 may access user activity information, associated user account information (including user identifiers associated with accounts and/or sets of activities), as well as activity timestamps, activity types, activity values, and breach probabilities.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a user identifier likely associated with a given activity, or a probability that a given activity is associated with a security breach).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user identifier corresponding to an activity, or breach indicator for an activity).

In some embodiments, the model (e.g., model 302) may automatically perform actions based on outputs 306. In some embodiments, the model (e.g., model 302) may not perform any actions. The output of the model (e.g., model 302) may be used to generate training data associated with users who create independent user accounts. The output may also be used to generate warnings for security breaches, such that accounts that are potentially compromised may be identified.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
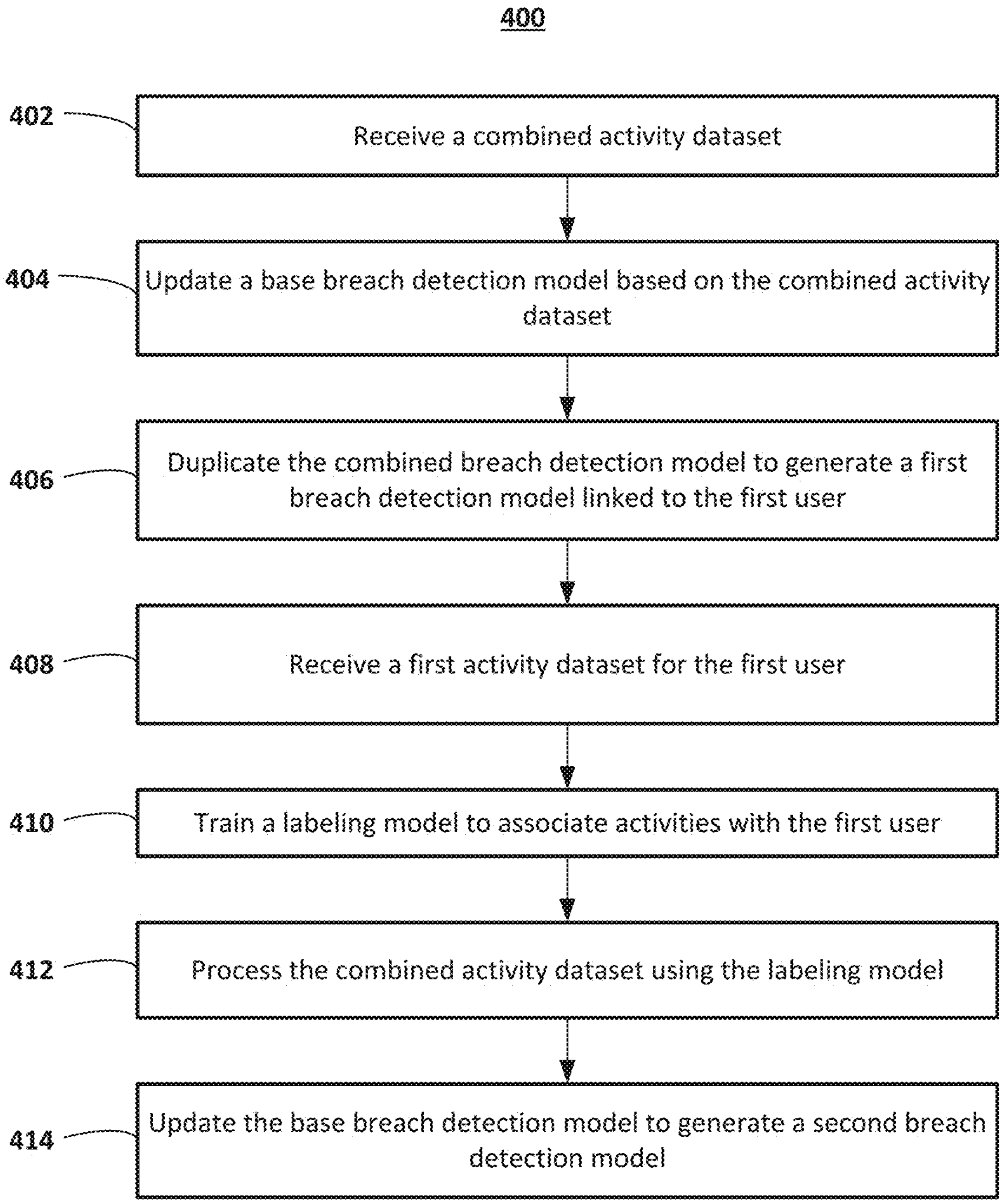
FIG. 4 shows a flowchart of the steps involved in training breach detection models based on labeling activity data associated with an independent user account, in accordance with one or more embodiments.

FIG. 4 shows a flowchart of the steps involved in improving security breach detection for independent user accounts created by users of combined accounts based on categorizing activity data, in accordance with one or more embodiments. For example, the system may use process 400 (e.g., as implemented on one or more system components described above) in order to improve detection of security breaches for credit card account users who create independent accounts subsequent to using combined credit card accounts with other users.

At operation 402, process 400 (e.g., using one or more components described above) enables the system to receive a combined activity dataset. For example, the system may receive a combined activity dataset, wherein the combined activity dataset includes a plurality of activities corresponding to a combined account and wherein the combined account is associated with a plurality of users. For example, the system may receive a dataset corresponding to a joint credit card account, where more than one authorized user may habitually make transactions using the corresponding credit card. By receiving information and activity relating to a combined account, the system may evaluate the potential that a security breach may have occurred based on activity associated with the account. Because multiple users may be using the account, by considering the combined activity data for these users, the system may account for different habits of different users associated with the account.

At operation 404, process 400 (e.g., using one or more components described above) enables the system to update a base breach detection model based on the combined activity dataset. For example, the system may update a base breach detection model based on the combined activity dataset to generate a combined breach detection model, wherein the combined breach detection model is trained to detect breach activity for the plurality of users. As an illustrative example, based on the combined activity data associated with users of the combined user account, the system may personalize a preexisting security breach detection algorithm (e.g., the base breach detection model) based on the particular habits of the users of the combined account. One user of the combined account may, for example, make online purchases with the corresponding credit card at late hours, while another user may be more likely to make in-person purchases during business hours. By capturing the variability in activity within an account, the system may improve both specificity and sensitivity when determining a data breach, thereby improving the rate of false positive identifications.

At operation 406, process 400 (e.g., using one or more components described above) enables the system to duplicate the combined base detection model to generate a first breach detection model linked to the first user. For example, in response to receiving an indication of a second account created for the first user, the system may duplicate the first breach detection model to generate a second breach detection model, linking the second breach detection model to the second user, and delinking the first breach detection model from the second user. In some cases, a user of the combined account, for example, may generate a new, personal account without any of the other users of the combined account. In response to this creation of a new account, the system may utilize the combined breach detection model as a base for a breach detection model for the new account. By doing so, the system may leverage existing information about the user's habits in order to more effectively detect security breach events in the independent user's account, as the independent user's activity may be (at least partially) reflected in the combined activity dataset. At operation 408, process 400 (e.g., using one or more components described above) enables the system to receive a first activity dataset for the first user. For example, subsequent to generating the first breach detection model, the system may receive a first activity dataset for the first user. As an illustrative example, as a user who has created a new account utilizes the account more (e.g., makes more purchases), the system may learn more about the user's activity in isolation from the other users of the combined account. As such, the system may improve detection of security breaches associated with users of independent accounts based on their evident activity. At operation 410, process 400 (e.g., using one or more components described above) enables the system to train a labeling model to associate activities from the first activity dataset with the first user. For example, the system may use the information relating to the user of the newly created credit card account in order to learn about the user's habits and customary activities. In doing so, the system may train a model to distinguish activities that are associated with this user from other activities, such as activities in the combined dataset that are not associated with the user that generated the new account.

In some embodiments, the system may utilize the labeling model to label activities that may be associated with remaining users of the combined user account. For example, the system may delink the combined breach detection model from one or more remaining users of the plurality of users, wherein the one or more remaining users include the plurality of users that are associated with the combined account subsequent to creating the first user account. The system may receive a second activity dataset for the one or more remaining users. The system may train the labeling model to associate activities from the second activity dataset with the one or more remaining users. For example, the system may train the labeling model to determine activities that are not likely to be associated with the first user (i.e., the user who has created his/her/their own account). By doing so, the system may further learn about habits and activities that are associated with the remaining users of the combined user account (e.g., the remaining authorized user of a combined credit card account). As such, the system may leverage this information to improve handling of the combined user account.

In some embodiments, the system may train the labeling model based on training data that includes information regarding activities associated with both the combined user account as well as the first user account. For example, based on an account database, the system may determine a first account identifier for the first user account corresponding to the first user and a second account identifier for the combined account corresponding to the one or more remaining users. The system may generate first training data, wherein the first training data comprises the first account identifier and the first activity dataset. The system may generate second training data, wherein the second training data comprises the second account identifier and the second activity dataset. Based on the first training data and the second training data, the system may train the labeling model to associate activities of the plurality of activities with the combined account or with the first user account. For example, the system may look up, in an account database, information relating to credit card accounts through credit card numbers and, based on retrieving transaction histories relating to both the combined account and the newly created account, the system may generate data that may enable the labeling model to discern between the first user and the remaining users of the combined account. By doing so, the system further improves the quality of training data associated with training a model to generate warnings for security breaches, as the training data may enable each model to be personalized and specific to the users using the corresponding accounts.

For example, in some embodiments, the system may utilize labeled activity from the combined activity dataset to generate a model for the combined account following the first user's departure. The system may process the combined activity dataset using the labeling model to associate activities from a second portion of the combined activity dataset with the one or more remaining users. The system may update the base breach detection model based on the activities from the second activity dataset and the second portion of the combined activity dataset to generate a third breach detection model, wherein the third breach detection model is trained to detect breach activity for the one or more remaining users. For example, the system may utilize the trained labeling model to classify the activity within the combined activity dataset into corresponding to either the first user, or the remaining users of the combined user account. In turn, the system may generate a new breach detection model based on activities pertinent to the combined user account following the departure of one of its users. By doing so, the system enables improvements to the specificity and accuracy of the breach detection model for the combined users, thereby improving security breach detection for more than just the newly generated account.

In some embodiments, the system may receive further activity data corresponding to the combined user account, as well as breach indicators, and train the third breach detection model based on this information. For example, subsequent to generating the third breach detection model, the system may receive a fourth activity dataset corresponding to the one or more remaining users and a plurality of breach indicators, wherein each breach indicator of the plurality of breach indicators comprises an indication of whether a corresponding activity of the fourth activity dataset is associated with breach activity. Thus, the system may update the third breach detection model by training the third breach detection model using the fourth activity dataset and the plurality of breach indicators. For example, the system may receive information relating to the remaining users' activity within the combined user account after the first user may have split off to generate the new user account. The system may leverage information regarding whether this activity is associated with security breaches or not and, as such, train the model to better understand the behavior of the remaining users. By doing so, the system enables improvements to the accuracy of the breach detection model dynamically, as further activities are initiated and recorded.

In some embodiments, a second user of the remaining users may start a new account; as such, the system may generate an updated model for this second user's new account using the methods outlined herein. For example, in response to receiving an indication of a second user account created for a second user of the one or more remaining users, the system may duplicate the third breach detection model to generate a fourth breach detection model that is trained to detect breach activity for the second user. Based on receiving a third activity dataset corresponding to the second user account, the system may train the labeling model to associate activities from the third activity dataset with the second user. Based on processing the combined activity dataset and the second activity dataset using the labeling model, the system may update the base breach detection model to generate a sixth breach detection model, wherein the sixth breach detection model is trained to detect breach activity for the second user. For example, a second authorized user of a combined credit card account may determine to start a new credit card account for herself, while disassociating with the combined account. Based on activity associated with the second user's account, the system may learn about the second user's transaction habits and generate a new base breach detection model that is personalized to the second user. By doing so, the system enables dynamic updating of security-related models for improved accuracy in detecting malicious activity.

In some embodiments, the system may update the first user's breach detection model based on activities determined to be associated with the first user. For example, based on matching each account identifier of the plurality of account identifiers with the corresponding activity of the plurality of activities, the system may determine a subset of activities, wherein the subset of activities comprises labeled activities of the plurality of activities that correspond to the first account identifier. The system may update the base breach detection model based on the activities from the first activity dataset and the subset of activities to generate the second breach detection model. For example, the system may utilize information from the labeling model regarding which activities in the combined activity dataset correspond to the first user. In response, the system may generate the user's breach detection model based on these activities deemed to be associated with the first user. By doing so, the system may improve the quality and effectiveness of security breach detection, based on the improved training data based on labeling previously acquired data according to its likely corresponding account.

In some embodiments, the system may update the breach detection model based on activities associated with the first user account subsequent to its creation. Subsequent to generating the second breach detection model, the system may receive a third activity dataset corresponding to the first user and a plurality of breach indicators, wherein each breach indicator of the plurality of breach indicators comprises an indication of whether a corresponding activity of the third activity dataset includes a breach activity. The system may update the second breach detection model by training the second breach detection model using the third activity dataset and the plurality of breach indicators. For example, the system may receive information (e.g., a list of credit card transactions) relating to the first user, as well as whether this information was related to or associated with security breaches (e.g., fraudulent transactions). The system may train the breach detection model corresponding to the first user account according to this information; by doing so, the system may dynamically update breach detection capabilities based on incoming activity associated with the event, along with information confirming the authenticity of the information. In some embodiments, the system may receive an update or a patch to the base breach detection model and update models accordingly. For example, the system may receive updated model parameters for the base breach detection model. The system may update the base breach detection model based on the updated model parameters. The system may update the second breach detection model based on training the base breach detection model using the activities from the first activity dataset and the first portion of the combined activity dataset. For example, the system may receive an update to the base detection model (e.g., due to security patches or improved system-wide security breach data). The system may subsequently update account-specific breach detection models (e.g., the second breach detection model) based on this updated base model. By doing so, the system may ensure that breach detection may stay accurate and may mitigate the obsolescence of any given breach detection model over time.

In some embodiments, the system may generate the second breach detection model using the first breach detection model (e.g., as opposed to the base detection model). For example, the system may update the first breach detection model based on the activities from the first activity dataset and the first portion of the combined activity dataset to generate the second breach detection model, wherein the second breach detection model is trained to detect breach activity for the first user. For example, the system may generate the second breach detection model for the first user using the model generated from the preliminary activity information. By doing so, the system may retain model parameters associated with the first user's initial activities, thereby enabling the system to further update and tune the model based on labeled activities and/or future activities.

At operation 412, process 400 (e.g., using one or more components described above) enables the system to process the combined activity dataset using the labeling model. For example, the system may process the combined activity dataset using the labeling model to associate activities from a first portion of the combined activity dataset with the first user. In some embodiments, the system may classify transactions associated with the combined user dataset based on whether each transaction was likely associated with the first user. By doing so, the system may glean further information regarding habits associated with the first user, even prior to the creation of the new account. Thus, the system improves knowledge of activity associated with the first user beyond activity associated with the independent user account (e.g., beyond the first activity dataset for the first user, described above).

In some embodiments, the system may generate account identifiers associated with activities of the combined activity dataset, in order to generate training data for breach detection models. For example, processing the combined activity dataset using the labeling model may include processing the plurality of activities using the labeling model to generate a plurality of account identifiers, wherein each account identifier of the plurality of account identifiers associates a corresponding activity of the plurality of activities with a first account identifier corresponding to the first user account or a second account identifier corresponding to the combined account. As an illustrative example, the system may associate credit card numbers associated with user accounts to the corresponding activities in the combined activity dataset, thereby enabling discernment of activities as corresponding to the first user or to the one or more remaining users. As discussed above, by associating activities with either the first user or the users of the combined user account, the system may improve the quality of data regarding the habitual activities of users, thereby improving the quality of data for making decisions relating to security breach detection.

At operation 414, process 400 (e.g., using one or more components described above) enables the system to update the base breach detection model to generate a second breach detection model. For example, the system may update the base breach detection model based on the activities from the first activity dataset and the activities from the first portion of the combined activity dataset to generate a second breach detection model, wherein the second breach detection model is trained to detect breach activity for the first user. As an illustrative example, the system may leverage information regarding the first user's activities from the combined user activity dataset in order to improve the accuracy of the breach detection model for the independent user account. As such, the system may detect security breaches and unauthorized access to the user account with improved effectiveness, as activities that are not associated with the first user (even if potentially associated with other users of the combined account) may still be marked as being indicative of a security breach for the first user's private/independent account. Thus, the system and methods disclosed herein improve the sensitivity of detecting security breaches.

In some embodiments, the system may update the base breach detection model to generate the combined breach detection model by utilizing training data, including breach indicators, associated with the combined user activity. For example, the system may determine, for the plurality of activities, a plurality of breach indicators, wherein each breach indicator of the plurality of breach indicators indicates whether a corresponding activity of the plurality of activities is associated with a breach. The system may update the base breach detection model based on the plurality of activities and the plurality of breach indicators to generate the combined breach detection model. For example, the system may determine whether activities of the combined activity dataset were subject to or associated with a security breach (e.g., whether transactions associated with a combined bank account were deemed fraudulent). By generating training data based on the activities and whether they are associated with security breaches, the system may personalize and improve the quality of the base breach detection model, tailored to the activities associated with the users of the combined account.

In some embodiments, the system may process activities associated with user accounts with the breach detection model to generate breach probabilities. For example, the system may receive a first activity associated with the first user account, wherein the first activity comprises an indication of an account-related event. Based on processing the first activity using the second breach detection model, the system may generate a breach probability, wherein the breach probability indicates a likelihood that the first activity is not associated with the first user. For example, the system may receive a transaction associated with a credit card account, where the transaction includes details of the merchant, value and type of transaction. Based on inputting the transaction into the breach detection model, the system may determine the likelihood that the transaction is associated with fraudulent behavior (e.g., is indicative of a security breach). By doing so, the system enables dynamic detection of irregularities and potential breaches, thereby enabling mitigation of security breaches before propagation, damage, or loss of property or resources.

In some embodiments, the system may determine that a breach is likely based on comparing the breach probability with a threshold and issue a warning accordingly. For example, the system may compare the breach probability with a threshold probability, wherein the threshold probability indicates a probability value where a potential breach has occurred. Based on determining that the breach probability is greater than the threshold probability, the system may generate a first message for display on a user interface, wherein the user interface is associated with a first user device for the first user, and wherein the first message comprises an indication of a potential breach. For example, the system may compare a breach probability associated with a credit card transaction for a user account with a threshold; based on determining that the probability of a security breach having occurred is higher than the threshold, the system may determine to warn the user that there may have been a breach. By doing so, the system enables the user or the administrator to take evasive action against the security breach, helping to mitigate any effects due to the breach in advance.

In some embodiments, the system may enable the user to deactivate the account in response to the warning message. For example, based on generating the first message, the system may receive a user response from the first user device, wherein the response indicates whether the first activity is associated with the first user. Based on determining that the response indicates that the first activity is not associated with the first user, the system may determine to deactivate the first user account. For example, the system may display a warning message on a user interface associated with the user asking for input as to whether to deactivate the account based on the breach. The user may click on a button (e.g., interact with a mechanism on the user interface) in order to respond, thereby indicating whether the flagged activity is associated with the first user or not. As such, the system may enable the user to provide feedback as to the accuracy of a security breach determination, thereby reducing the incidence of false positive breach detections.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a combined activity dataset, wherein the combined activity dataset comprises a plurality of activities corresponding to a first account, and wherein the first account is associated with at least a first user and a second user; updating a base breach detection model based on the combined activity dataset to generate a first breach detection model, wherein the base breach detection model is previously trained to detect breach activity for a generic user, and wherein the first breach detection model is trained to detect breach activity for at least the first user and the second user; in response to receiving an indication of a second account created for the second user, duplicating the first breach detection model to generate a second breach detection model, linking the second breach detection model to the second user, and delinking the first breach detection model from the second user; subsequent to generating the second breach detection model, receiving a first activity dataset for the first user and a second activity dataset for the second user; training a labeling model to associate activities from the first activity dataset with the first user and to associate activities from the second activity dataset with the second user; processing the combined activity dataset using the labeling model to associate activities from a first portion of the combined activity dataset with the first user and to associate activities from a second portion of the combined activity dataset with the second user; updating the base breach detection model based on the activities from the first activity dataset and the activities from the first portion of the combined activity dataset to generate a third breach detection model, wherein the third breach detection model is trained to detect breach activity for the first user; and updating the base breach detection model based on the activities from the second activity dataset and the activities from the second portion of the combined activity dataset to generate a fourth breach detection model, wherein the fourth breach detection model is trained to detect breach activity for the second user.
2. A method comprising: receiving a combined activity dataset, wherein the combined activity dataset comprises a plurality of activities corresponding to a combined account, and wherein the combined account is associated with a plurality of users; updating a base breach detection model based on the combined activity dataset to generate a combined breach detection model, wherein the combined breach detection model is trained to detect breach activity for the plurality of users; in response to receiving an indication of a first user account created for a first user of the plurality of users, duplicating the combined breach detection model to generate a first breach detection model that is linked to the first user; subsequent to generating the first breach detection model, receiving a first activity dataset for the first user; training a labeling model to associate activities from the first activity dataset with the first user; processing the combined activity dataset using the labeling model to associate activities from a first portion of the combined activity dataset with the first user; and updating the base breach detection model based on the activities from the first activity dataset and the activities from the first portion of the combined activity dataset to generate a second breach detection model, wherein the second breach detection model is trained to detect breach activity for the first user.

3. A method comprising: receiving a combined activity dataset, wherein the combined activity dataset comprises a plurality of activities corresponding to a combined account, and wherein the combined account is associated with a plurality of users; generating a combined breach detection model, wherein the combined breach detection model is trained to detect breach activity for the plurality of users; in response to receiving an indication of a first user account created for a first user of the plurality of users, duplicating the combined breach detection model to generate a first breach detection model that is linked to the first user; subsequent to generating the first breach detection model, receiving a first activity dataset for the first user; training a labeling model to associate activities from the first activity dataset with the first user; processing the combined activity dataset using the labeling model to associate activities from a first portion of the combined activity dataset with the first user; and updating the combined breach detection model based on the activities from the first activity dataset and the activities from the first portion of the combined activity dataset to generate a second breach detection model, wherein the second breach detection model is trained to detect breach activity for the first user.

4. The method of any one of the preceding embodiments, further comprising: receiving a first activity associated with the first user account, wherein the first activity comprises an indication of an account-related event; and based on processing the first activity using the second breach detection model, generating a breach probability, wherein the breach probability indicates a likelihood that the first activity is not associated with the first user.

5. The method of any one of the preceding embodiments, further comprising: comparing the breach probability with a threshold probability, wherein the threshold probability indicates a probability value where a potential breach has occurred; and based on determining that the breach probability is greater than the threshold probability, generating a first message for display on a user interface, wherein the user interface is associated with a first user device for the first user, and wherein the first message comprises an indication of a potential breach.

6. The method of any one of the preceding embodiments, further comprising: based on generating the first message, receiving a user response from the first user device, wherein the response indicates whether the first activity is associated with the first user; and based on determining that the response indicates that the first activity is not associated with the first user, determining to deactivate the first user account.

7. The method of any one of the preceding embodiments, wherein updating the base breach detection model based on the combined activity dataset to generate the combined breach detection model comprises: determining, for the plurality of activities, a plurality of breach indicators, wherein each breach indicator of the plurality of breach indicators indicates whether a corresponding activity of the plurality of activities is associated with a breach; and updating the base breach detection model based on the plurality of activities and the plurality of breach indicators to generate the combined breach detection model.

8. The method of any one of the preceding embodiments, further comprising: delinking the combined breach detection model from one or more remaining users of the plurality of users, wherein the one or more remaining users comprise the plurality of users associated with the combined account subsequent to creating the first user account; receiving a second activity dataset for the one or more remaining users; and training the labeling model to associate activities from the second activity dataset with the one or more remaining users.

9. The method of any one of the preceding embodiments, wherein training the labeling model comprises: based on an account database, determining a first account identifier for the first user account corresponding to the first user and a second account identifier for the combined account corresponding to the one or more remaining users; generating first training data, wherein the first training data comprises the first account identifier and the first activity dataset; generating second training data, wherein the second training data comprises the second account identifier and the second activity dataset; and based on the first training data and the second training data, training the labeling model to associate activities of the plurality of activities with the combined account or with the first user account.

10. The method of any one of the preceding embodiments, further comprising: processing the combined activity dataset using the labeling model to associate activities from a second portion of the combined activity dataset with the one or more remaining users; and updating the base breach detection model based on the activities from the second activity dataset and the second portion of the combined activity dataset to generate a third breach detection model, wherein the third breach detection model is trained to detect breach activity for the one or more remaining users.

11. The method of any one of the preceding embodiments, further comprising: subsequent to generating the third breach detection model, receiving a fourth activity dataset corresponding to the one or more remaining users and a plurality of breach indicators, wherein each breach indicator of the plurality of breach indicators comprises an indication of whether a corresponding activity of the fourth activity dataset is associated with breach activity; and updating the third breach detection model by training the third breach detection model using the fourth activity dataset and the plurality of breach indicators.

12. The method of any one of the preceding embodiments, further comprising: in response to receiving an indication of a second user account created for a second user of the one or more remaining users, duplicating the third breach detection model to generate a fourth breach detection model that is trained to detect breach activity for the second user; based on receiving a third activity dataset corresponding to the second user account, training the labeling model to associate activities from the third activity dataset with the second user; and based on processing the combined activity dataset and the second activity dataset using the labeling model, updating the base breach detection model to generate a sixth breach detection model, wherein the sixth breach detection model is trained to detect breach activity for the second user.

13. The method of any one of the preceding embodiments, wherein processing the combined activity dataset using the labeling model comprises processing the plurality of activities using the labeling model to generate a plurality of account identifiers, wherein each account identifier of the plurality of account identifiers associates a corresponding activity of the plurality of activities with a first account identifier corresponding to the first user account or a second account identifier corresponding to the combined account.

14. The method of any one of the preceding embodiments, wherein updating the base breach detection model to generate the second breach detection model comprises: based on matching each account identifier of the plurality of account identifiers with the corresponding activity of the plurality of activities, determining a subset of activities, wherein the subset of activities comprises labeled activities of the plurality of activities that correspond to the first account identifier; and updating the base breach detection model based on the activities from the first activity dataset and the subset of activities to generate the second breach detection model.

15. The method of any one of the preceding embodiments, further comprising: subsequent to generating the second breach detection model, receiving a third activity dataset corresponding to the first user and a plurality of breach indicators, wherein each breach indicator of the plurality of breach indicators comprises an indication of whether a corresponding activity of the third activity dataset includes a breach activity; and updating the second breach detection model by training the second breach detection model using the third activity dataset and the plurality of breach indicators.

16. The method of any one of the preceding embodiments, further comprising: receiving updated model parameters for the base breach detection model; updating the base breach detection model based on the updated model parameters; and updating the second breach detection model based on training the base breach detection model using the activities from the first activity dataset and the first portion of the combined activity dataset.

17. The method of any one of the preceding embodiments, further comprising updating the first breach detection model based on the activities from the first activity dataset and the first portion of the combined activity dataset to generate the second breach detection model, wherein the second breach detection model is trained to detect breach activity for the first user.

18. A non-transitory, computer-readable medium storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

21. A system comprising cloud-based circuitry for performing any of embodiments 1-17.

What is claimed is:

1. A system for detecting unauthorized access to a networked application based on discerning user activity data, the system comprising:

one or more processors; and a non-transitory, computer-readable medium comprising instructions that, when executed by the one or more processors, cause operations comprising:

receiving a combined activity dataset, wherein the combined activity dataset comprises a plurality of activities corresponding to a first account, and wherein the first account is associated with at least a first user and a second user;

updating a base breach detection model based on the combined activity dataset to generate a first breach detection model, wherein the base breach detection model is previously trained to detect breach activity for a generic user, and wherein the first breach detection model is trained to detect breach activity for at least the first user and the second user;

in response to receiving an indication of a second account created for the second user, duplicating the first breach detection model to generate a second breach detection model, linking the second breach detection model to the second user, and delinking the first breach detection model from the second user;

subsequent to generating the second breach detection model, receiving a first activity dataset for the first user and a second activity dataset for the second user;

training a labeling model to associate activities from the first activity dataset with the first user and to associate activities from the second activity dataset with the second user;

processing the combined activity dataset using the labeling model to associate activities from a first portion of the combined activity dataset with the first user and to associate activities from a second portion of the combined activity dataset with the second user;

updating the base breach detection model based on the activities from the first activity dataset and the activities from the first portion of the combined activity dataset to generate a third breach detection model, wherein the third breach detection model is trained to detect breach activity for the first user; and updating the base breach detection model based on the activities from the second activity dataset and the activities from the second portion of the combined activity dataset to generate a fourth breach detection model, wherein the fourth breach detection model is trained to detect breach activity for the second user.

2. A method for detecting unauthorized access to a networked application based on discerning user activity data, the method comprising:

receiving a combined activity dataset, wherein the combined activity dataset comprises a plurality of activities corresponding to a combined account, and wherein the combined account is associated with a plurality of users;

updating a base breach detection model based on the combined activity dataset to generate a combined breach detection model, wherein the combined breach detection model is trained to detect breach activity for the plurality of users;

in response to receiving an indication of a first user account created for a first user of the plurality of users, duplicating the combined breach detection model to generate a first breach detection model that is linked to the first user;

subsequent to generating the first breach detection model, receiving a first activity dataset for the first user;

training a labeling model to associate activities from the first activity dataset with the first user;

processing the combined activity dataset using the labeling model to associate activities from a first portion of the combined activity dataset with the first user; and updating the base breach detection model based on the activities from the first activity dataset and the activities from the first portion of the combined activity dataset to generate a second breach detection model, wherein the second breach detection model is trained to detect breach activity for the first user.

3. The method of claim 2, further comprising:

receiving a first activity associated with the first user account, wherein the first activity comprises an indication of an account-related event; and based on processing the first activity using the second breach detection model, generating a breach probability, wherein the breach probability indicates a likelihood that the first activity is not associated with the first user.

4. The method of claim 3, further comprising:

comparing the breach probability with a threshold probability, wherein the threshold probability indicates a probability value where a potential breach has occurred; and based on determining that the breach probability is greater than the threshold probability, generating a first message for display on a user interface, wherein the user interface is associated with a first user device for the first user, and wherein the first message comprises an indication of a potential breach.

5. The method of claim 4, further comprising:

based on generating the first message, receiving a user response from the first user device, wherein the response indicates whether the first activity is associated with the first user; and based on determining that the response indicates that the first activity is not associated with the first user, determining to deactivate the first user account.

6. The method of claim 2, wherein updating the base breach detection model based on the combined activity dataset to generate the combined breach detection model comprises:

determining, for the plurality of activities, a plurality of breach indicators, wherein each breach indicator of the plurality of breach indicators indicates whether a corresponding activity of the plurality of activities is associated with a breach; and updating the base breach detection model based on the plurality of activities and the plurality of breach indicators to generate the combined breach detection model.

7. The method of claim 2, further comprising:

delinking the combined breach detection model from one or more remaining users of the plurality of users, wherein the one or more remaining users comprise the plurality of users associated with the combined account subsequent to creating the first user account;

receiving a second activity dataset for the one or more remaining users; and training the labeling model to associate activities from the second activity dataset with the one or more remaining users.

8. The method of claim 7, wherein training the labeling model comprises:

based on an account database, determining a first account identifier for the first user account corresponding to the first user and a second account identifier for the combined account corresponding to the one or more remaining users;

generating first training data, wherein the first training data comprises the first account identifier and the first activity dataset;

generating second training data, wherein the second training data comprises the second account identifier and the second activity dataset; and based on the first training data and the second training data, training the labeling model to associate activities of the plurality of activities with the combined account or with the first user account.

9. The method of claim 7, further comprising:

processing the combined activity dataset using the labeling model to associate activities from a second portion of the combined activity dataset with the one or more remaining users; and updating the base breach detection model based on the activities from the second activity dataset and the second portion of the combined activity dataset to generate a third breach detection model, wherein the third breach detection model is trained to detect breach activity for the one or more remaining users.

10. The method of claim 9, further comprising:

subsequent to generating the third breach detection model, receiving a fourth activity dataset corresponding to the one or more remaining users and a plurality of breach indicators, wherein each breach indicator of the plurality of breach indicators comprises an indication of whether a corresponding activity of the fourth activity dataset is associated with breach activity; and updating the third breach detection model by training the third breach detection model using the fourth activity dataset and the plurality of breach indicators.

11. The method of claim 10, further comprising:

in response to receiving an indication of a second user account created for a second user of the one or more remaining users, duplicating the third breach detection model to generate a fourth breach detection model that is trained to detect breach activity for the second user;

based on receiving a third activity dataset corresponding to the second user account, training the labeling model to associate activities from the third activity dataset with the second user; and based on processing the combined activity dataset and the second activity dataset using the labeling model, updating the base breach detection model to generate a sixth breach detection model, wherein the sixth breach detection model is trained to detect breach activity for the second user.

12. The method of claim 2, wherein processing the combined activity dataset using the labeling model comprises processing the plurality of activities using the labeling model to generate a plurality of account identifiers, wherein each account identifier of the plurality of account identifiers associates a corresponding activity of the plurality of activities with a first account identifier corresponding to the first user account or a second account identifier corresponding to the combined account.

13. The method of claim 12, wherein updating the base breach detection model to generate the second breach detection model comprises:

based on matching each account identifier of the plurality of account identifiers with the corresponding activity of the plurality of activities, determining a subset of activities, wherein the subset of activities comprises labeled activities of the plurality of activities that correspond to the first account identifier; and updating the base breach detection model based on the activities from the first activity dataset and the subset of activities to generate the second breach detection model.

14. The method of claim 2, further comprising:

subsequent to generating the second breach detection model, receiving a third activity dataset corresponding to the first user and a plurality of breach indicators, wherein each breach indicator of the plurality of breach indicators comprises an indication of whether a corresponding activity of the third activity dataset includes a breach activity; and updating the second breach detection model by training the second breach detection model using the third activity dataset and the plurality of breach indicators.

15. The method of claim 2, further comprising:

receiving updated model parameters for the base breach detection model;

updating the base breach detection model based on the updated model parameters; and updating the second breach detection model based on training the base breach detection model using the activities from the first activity dataset and the first portion of the combined activity dataset.

16. The method of claim 2, further comprising updating the first breach detection model based on the activities from the first activity dataset and the first portion of the combined activity dataset to generate the second breach detection model, wherein the second breach detection model is trained to detect breach activity for the first user.

17. A non-transitory, computer-readable medium comprising instructions that, when executed by one or more processors, cause operations comprising:

receiving a combined activity dataset, wherein the combined activity dataset comprises a plurality of activities corresponding to a combined account, and wherein the combined account is associated with a plurality of users;

generating a combined breach detection model, wherein the combined breach detection model is trained to detect breach activity for the plurality of users;

in response to receiving an indication of a first user account created for a first user of the plurality of users, duplicating the combined breach detection model to generate a first breach detection model that is linked to the first user;

subsequent to generating the first breach detection model, receiving a first activity dataset for the first user;

training a labeling model to associate activities from the first activity dataset with the first user;

processing the combined activity dataset using the labeling model to associate activities from a first portion of the combined activity dataset with the first user; and updating the combined breach detection model based on the activities from the first activity dataset and the activities from the first portion of the combined activity dataset to generate a second breach detection model, wherein the second breach detection model is trained to detect breach activity for the first user.

18. The non-transitory, computer-readable medium of claim 17, wherein the instructions cause operations further comprising:

receiving a first activity associated with the first user account, wherein the first activity comprises an indication of an account-related event; and based on processing the first activity using the second breach detection model, generating a breach probability, wherein the breach probability indicates a likelihood that the first activity is not associated with the first user.

19. The non-transitory, computer-readable medium of claim 18, wherein the instructions cause operations further comprising:

comparing the breach probability with a threshold probability, wherein the threshold probability indicates a probability value where a potential breach has occurred; and based on determining that the breach probability is greater than the threshold probability, generating a first message for display on a user interface, wherein the user interface is associated with a first user device for the first user, and wherein the first message comprises an indication of a potential breach.

20. The non-transitory, computer-readable medium of claim 17, wherein the instructions cause operations further comprising:

delinking the combined breach detection model from one or more remaining users of the plurality of users, wherein the one or more remaining users comprise the plurality of users associated with the combined account subsequent to creating the first user account;

receiving a second activity dataset for the one or more remaining users; and training the labeling model to associate activities from the second activity dataset with the one or more remaining users.

* * * * *